United States Patent
Ryu et al.

(10) Patent No.: US 8,236,107 B2
(45) Date of Patent: Aug. 7, 2012

(54) RUBBING APPARATUS OF LIQUID CRYSTAL DISPLAY DEVICE

(75) Inventors: Jae-Choon Ryu, Gyeongsangbuk-Do (KR); Hao-Joon Son, Busan (KR)

(73) Assignee: LG Display Co., Ltd., Seoul (KR)

( * ) Notice: Subject to any disclaimer, the term of this patent is extended or adjusted under 35 U.S.C. 154(b) by 824 days.

(21) Appl. No.: 11/822,623

(22) Filed: Jul. 9, 2007

(65) Prior Publication Data

US 2007/0254114 A1 Nov. 1, 2007

Related U.S. Application Data

(62) Division of application No. 10/975,471, filed on Oct. 29, 2004, now Pat. No. 7,252,863.

(30) Foreign Application Priority Data

Oct. 31, 2003 (KR) .............................. 10-2003-76956

(51) Int. Cl.
*C23C 16/00* (2006.01)
*G02F 1/1335* (2006.01)
*G02F 1/1337* (2006.01)

(52) U.S. Cl. ......... 118/718; 349/120; 349/123; 349/129

(58) Field of Classification Search .................. 349/120, 349/123, 129; 118/718
See application file for complete search history.

(56) References Cited

U.S. PATENT DOCUMENTS

| | | | |
|---|---|---|---|
| 4,946,623 A * | 8/1990 | Tabony | ...................... 252/62.56 |
| 5,186,985 A | 2/1993 | Estes et al. | |
| 6,178,580 B1 | 1/2001 | Ishihara et al. | |
| 6,723,396 B1 | 4/2004 | Patrick | |
| 2002/0071065 A1* | 6/2002 | Lee | ................................. 349/43 |
| 2002/0074932 A1 | 6/2002 | Bouchard et al. | |
| 2003/0067575 A1 | 4/2003 | Acosta et al. | |
| 2003/0138982 A1* | 7/2003 | Wei et al. | ......................... 438/30 |
| 2003/0150382 A1* | 8/2003 | Lai et al. | ....................... 118/718 |
| 2005/0042391 A1 | 2/2005 | Ryan et al. | |
| 2005/0219449 A1 | 10/2005 | Tanaka | |

OTHER PUBLICATIONS

Odenbach, S., Colloids and Surfaces A: Physicochem. Eng Aspects 217 (2003) 171-178.*
Mailk, R.; Sharma, R.; Kanjilal, D.; Annapoorni, S.; J. Phys. D: Appl. Phys. 42 (2009) 1-6.*
Mailk, R.; Sharma, R.; Kanjilal, D.; Annapoorni, S.; J. Phys. D: Appl. Phys. 42 (2009) 1-6) and Lee (US Patent Application No. 20020071065.*
Derwent Reference; ACC No. 2002-136975; Derwent Information LTD; published 2002.

* cited by examiner

*Primary Examiner* — Dah-Wei Yuan
*Assistant Examiner* — Binu Thomas
(74) *Attorney, Agent, or Firm* — Birch, Stewart, Kolasch & Birch, LLP

(57) ABSTRACT

A system that forms an alignment layer of a liquid crystal device has an applicator that applies an alignment layer of material on a substrate, a magnetic field generator that applies a magnetic field to directionally align the alignment layer material, and a firing device to fire the directionally aligned material.

5 Claims, 7 Drawing Sheets

RUBBING APPARATUS OF LIQUID CRYSTAL DISPLAY DEVICE

This is a divisional application of pending U.S. application Ser. No. 10/975,471, filed on Oct. 29, 2004, now U.S. Pat. No. 7,252,863 which claims the benefit of Korean Patent Application No. 10-2003-76956 filed on Oct. 31, 2003, the entire contents of which are herein fully incorporated by reference.

BACKGROUND OF THE INVENTION

1. Field of the Invention

The present invention relates to a liquid crystal display (LCD) device, and particularly, to a rubbing method of an LCD device, using a magnetic field.

2. Description of the Related Art

With recent developments of various portable electronic devices, such as mobile phones, personal digital assistants (PDAs), and notebook computers, demand for light weight, thin profile, small flat panel display devices is increasing. Present research includes active development of flat panel display devices including liquid crystal display (LCD) devices, plasma display panel (PDP) devices, field emission display (FED) devices, and vacuum fluorescent display (VFD) devices. Of these different devices, LCD devices are actively being developed due to the simple mass-production techniques necessary to produce them, their simple driving systems, and high picture quality.

Figure 1:
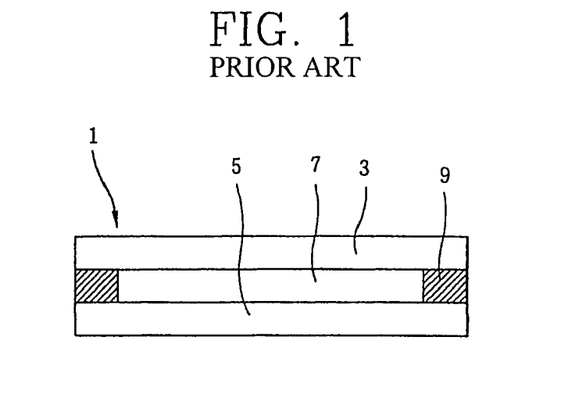
FIG. 1 is a cross-sectional view showing an LCD device according to related art.

FIG. 1 is a cross sectional view of a liquid crystal display device according to related art. In FIG. 1, a liquid crystal display device 1 includes a lower substrate 5, an upper substrate 3, and a liquid crystal layer 7 formed between the lower and upper substrates 5 and 3. The lower substrate 5 is a driving unit array substrate and includes a plurality of pixels (not shown), wherein each pixel includes a driving unit, such as a thin film transistor. The upper substrate 3 is a color filter substrate and includes a color filter layer for implementing display color.

A pixel electrode and a common electrode are respectively formed on the lower substrate 5 and the upper substrate 3. In addition, an alignment layer for aligning liquid crystal molecules of the liquid crystal layer 7 is formed on the pixel electrode and on the common electrode. The lower substrate 5 and the upper substrate 3 are attached by a sealing material 9, and the liquid crystal layer 7 is formed therebetween. The liquid crystal molecules of the liquid crystal layer 7 are driven by a driving unit formed at the lower substrate 5, wherein a quantity of light transmitted through the liquid crystal layer 7 is controlled to display an image.

Figure 2:
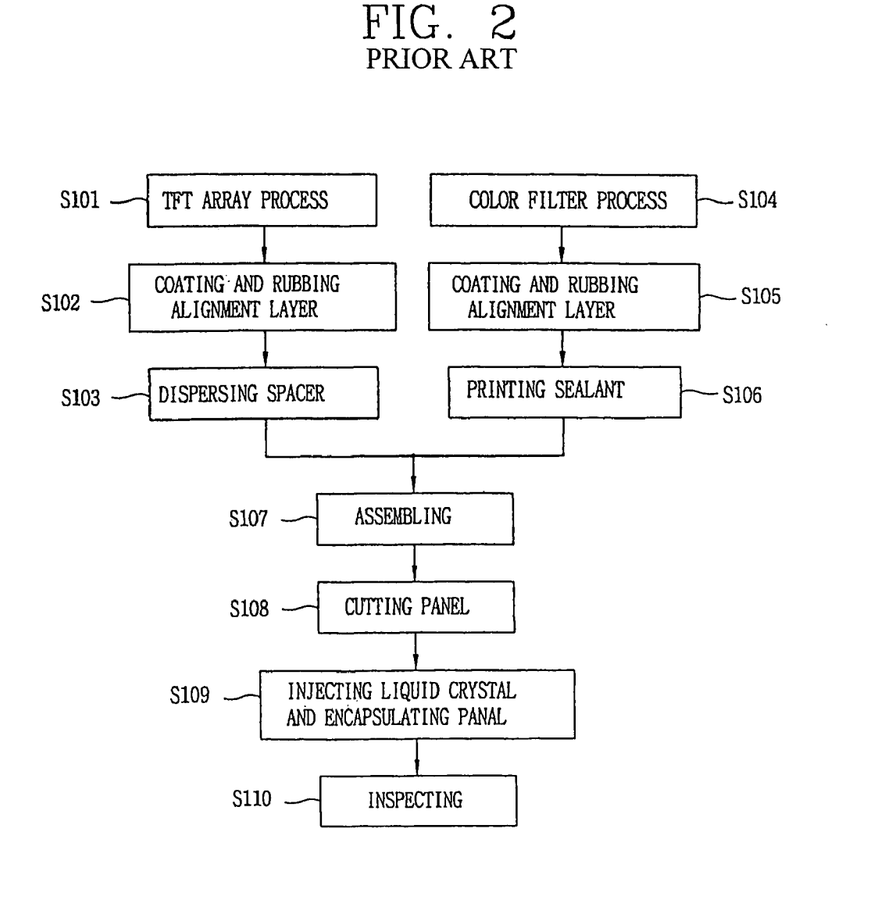
FIG. 2 is a flow chart showing a fabrication process of the LCD device according to related art.

FIG. 2 is a flow chart of a method for fabricating a liquid crystal display device according to the related art. In FIG. 2, the fabrication process of the liquid crystal display device is roughly divided into a driving unit array substrate process for forming a driving unit at the lower substrate 5, a color filter substrate process for forming the color filter at the upper substrate 3, and a cell process.

In FIG. 2, a step S101 includes forming a plurality of gate lines and a plurality of data lines on the lower substrate 5 using the driving device array process for defining a plurality of pixel areas. The step 101 includes formation of thin film transistors, and driving devices that are connected to the gate lines and the data lines at the pixel areas. In addition, a plurality of pixel electrodes, each of which is connected to one of the thin film transistors through the driving device array process, are formed. The pixel electrode drives a liquid crystal layer when a signal is transmitted through the thin film transistor.

A step S104 includes formation of a color filter layer of R, G, and B colors, and formation of a common electrode on the upper substrate using the color filter process.

Steps S102 and S105 both include formation of alignment layers on the upper and lower substrates, wherein the alignment layers are rubbed to provide the liquid crystal molecules of the liquid crystal layer formed between the upper and lower substrates with an initial alignment and surface fixing force (i.e., pre-tilt angle and orientation direction).

A step S103 includes scattering a plurality of spacers onto the lower substrate for maintaining a uniform cell gap between the upper and lower substrates.

A step S106 includes formation of a sealing material along an outer portion of the upper substrate.

A step S107 includes attaching the upper and lower substrates together by compressing the upper and lower substrates together.

A step S108 includes dividing the attached upper and lower substrates into a plurality of individual liquid crystal panels.

A step S109 includes injection of the liquid crystal material into the liquid crystal panels through a liquid crystal injection hole, wherein the liquid crystal injection hole is sealed to form the liquid crystal layer.

A step S110 includes testing the injected liquid crystal panel.

Operation of the LCD device makes use of an electro-optical effect of the liquid crystal material, wherein anisotropy of the liquid crystal material aligns liquid crystal molecules along a specific direction. Because control of the liquid crystal molecules significantly affects image stabilization of the LCD device, formation of the alignment layer is critical for fabricating an LCD device that produces quality images.

In general, the alignment layer forming process includes a printing process and a rubbing process. The rubbing process provides uniform alignment of the liquid crystal molecules to achieve a normal liquid crystal driving, and is a main factor contributing to uniform display characteristics.

Figure 3A:
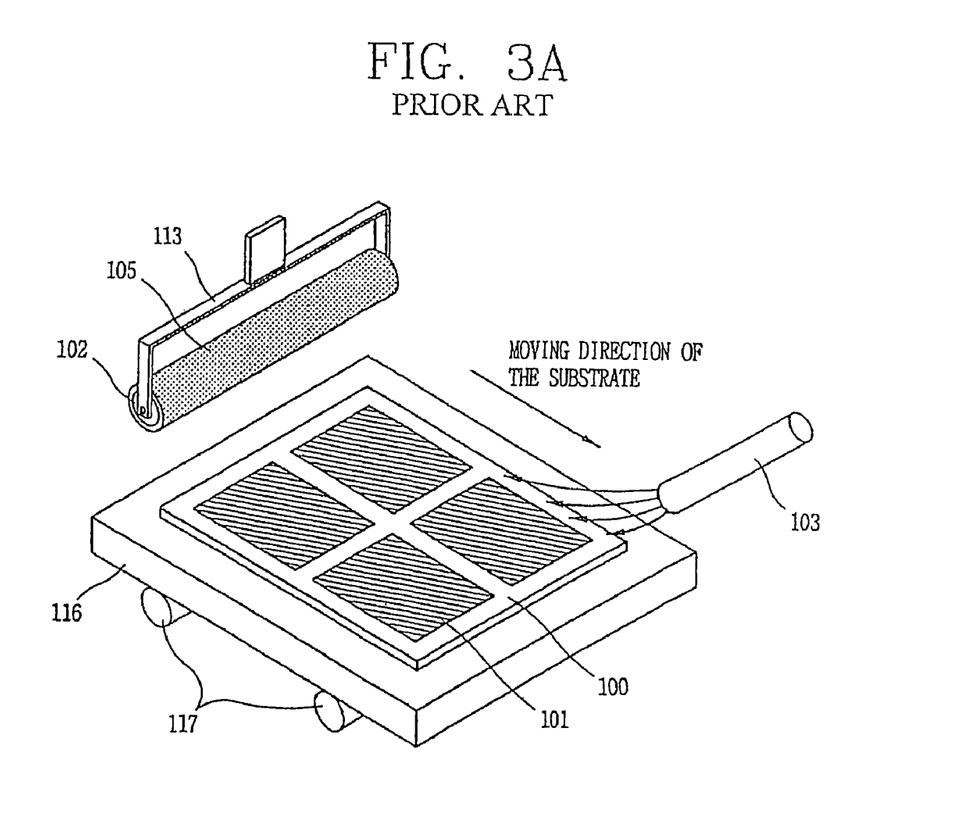
FIGS. 3A and 3B are views showing a rubbing method according to related art.
Figure 3B:
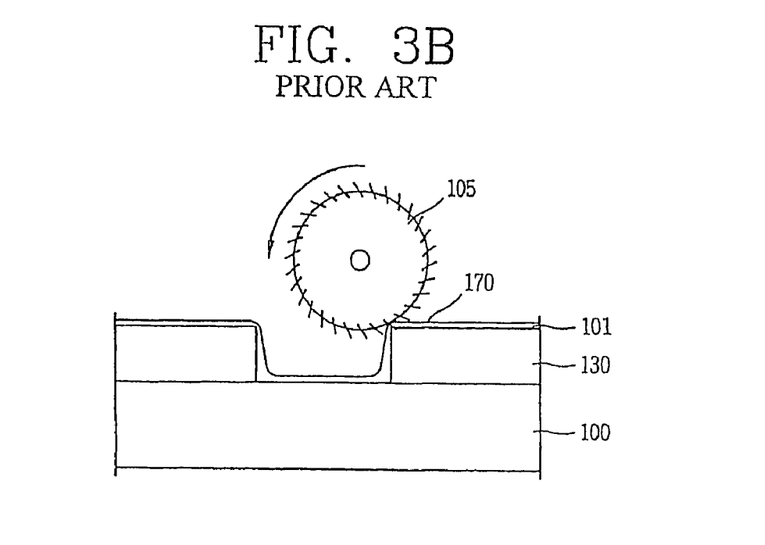

FIGS. 3A and 3B show an alignment layer rubbing process. As show therein, in the alignment layer rubbing process, an alignment layer 101 made of polyimide is formed on a substrate 100 having several cells, each cell having a thin film transistor or a color filter. An ion blower 103 operates on the alignment layer 101, thereby removing static electricity, and thin pieces of ionic materials generated in the rubbing process from the alignment layer 101. In the rubbing process, a rubbing roll 102 having a rubbing cotton 105 is rotated in place, and the substrate 100 is moved to the right by using a stage 116 and a driving roller 117 so that the alignment layer 101 passes under the rubbing cotton 105. In such a manner, a pattern is formed on the surface of the alignment layer 101. Here, not only the alignment layer 101 but also other substrate parts come in contact with the rubbing cotton 105. And, a rubbing pattern of the alignment layer 101 is controlled by upwardly or downwardly controlling the rubbing roll 102 to constantly maintain a gap between the substrate 100 and the rubbing roll 102. However, a step is generated because of the difference in height between the substrate 100 and patterns such as thin film transistors that are formed on the substrate. Moreover, because it is formed on the entire thin film transistor pattern 130, the alignment layer 101 is also applied on the step generated by the thin film transistor pattern 130 on the substrate 100.

Moreover, if the rubbing cotton 105 comes in contact with an alignment layer, formed at a position where the thin film transistor pattern 130 is formed, after the rubbing cotton 105 contacts with the alignment layer that is formed at a position where the thin film transistor pattern 130 is not formed, the rubbing cotton 105 can become damaged and then scratch the alignment layer formed at a position where the step does not even exist. That is, fine damage of the rubbing cotton 105 can cause scratches on the alignment layer in the rubbing process. When the rubbing cotton 105 advances into an active region 170, such a defective rubbing frequently occurs. Once defective rubbing occurs, scratches are continuously made on the active region 170. In addition, defective rubbing occurs in both twisted nematic (TN) mode LCD devices and in plane switching (IPS) mode LCD devices, and, especially, the defect is worse in IPS mode LCD devices.

As so far described, the rubbing method using the conventional rubbing roll is disadvantageous in that the rubbing cotton can be damaged by a step of a pattern, thereby causing scratches on the alignment layer. In addition, in the rubbing process, alignment layer remnants are generated in a valley formed in the alignment layer, and dusts are caused to float by rubbing cotton naps generated at the rubbing cotton. The scratches or dusts are main factors causing stains on a screen.

In addition, the rubbing method according to the related art is disadvantageous because space utilization is degraded as the rubbing roll becomes large in response to a large substrate, and uniform rubbing is made difficult because of inconstant pressure applied to the substrate by the rubbing roll.

SUMMARY OF THE INVENTION

Therefore, an object of the present invention is to provide an LCD device rubbing method capable of preventing defective rubbing due to scratches, dusts or the like and, thus, improving image quality by rubbing an alignment layer using a magnetic field.

Another object of the present invention is to provide an LCD device rubbing method capable of being applied to a large size LCD device by rubbing an alignment layer using a magnetic field.

To achieve these and other advantages and in accordance with the purpose of the present invention, as embodied and broadly described herein, there is provided a rubbing method of a liquid crystal display device including: providing a substrate; applying an alignment layer on the substrate; applying a magnetic field to the alignment layer by a magnetic field generator; and firing the alignment layer.

In another aspect of the present invention, there is provided a rubbing method of a liquid crystal display device including: providing a substrate; applying an alignment liquid containing a magneto-rheological fluid on the substrate; rotating the substrate on which the alignment layer has been applied at a certain angle; passing the substrate under a magnetic field generating device by moving the substrate and forming a valley having a rubbing angle θ1 to determine a pre-tilt angle of a liquid crystal molecules by exposing the alignment layer to a magnetic field; and firing the alignment layer exposed to the magnetic field.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this disclosure, illustrate embodiments of the invention and together with the written description serve to explain the principles of the invention.

In the drawings.

DETAILED DESCRIPTION OF THE PREFERRED EMBODIMENTS

Reference will now be made in detail to preferred exemplary embodiments of the present invention, which are illustrated in the accompanying drawings.

Figure 4:
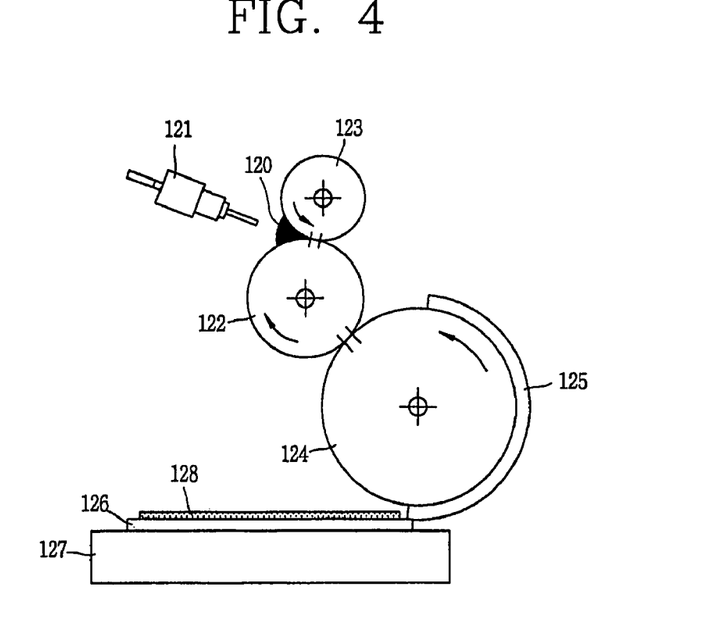
FIG. 4 is a view showing an alignment layer applying process.
Figure 5:
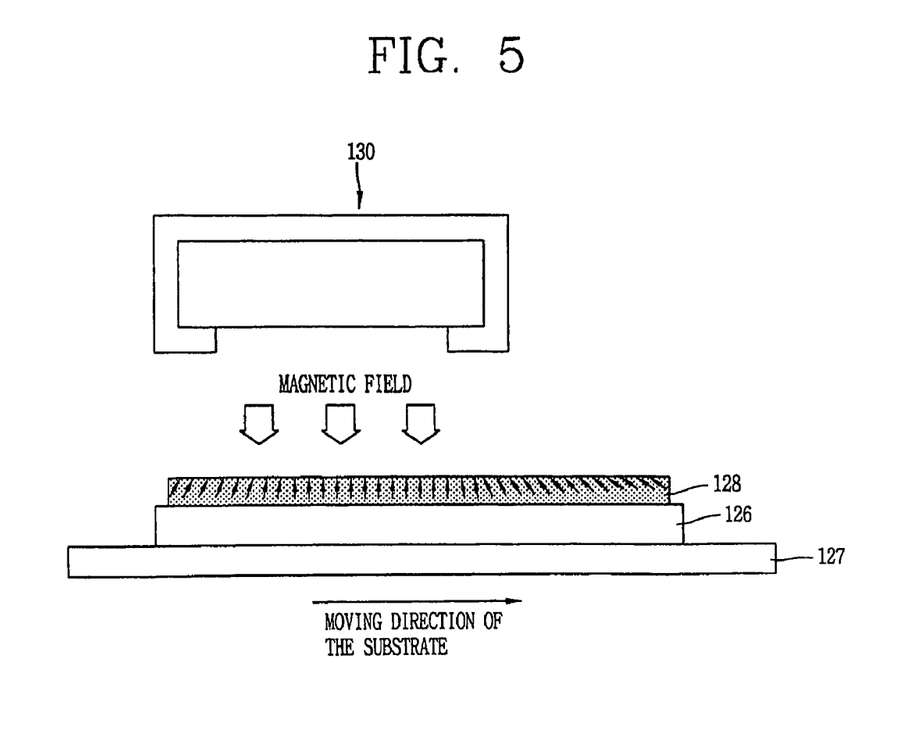
FIG. 5 is a view showing an alignment layer rubbing process according to the present invention.

FIGS. 4 and 5 show a rubbing method according to the present invention. Here, FIG. 4 shows an alignment layer applying process by a roll printing method, and FIG. 5 illustrates a rubbing process of an alignment layer.

As shown in FIG. 4, an alignment layer is applied through a plurality of rolls. Namely, an alignment liquid 120 supplied between a cylindrical anylox roll 122 and a doctor roll 123 is uniformly applied on the entire anylox roll 122 according to the rotation of the anylox roll 122 and the doctor roll 123. Here, a dispenser 121 supplies the alignment liquid 120.

When the anylox roll 122 rotates in contact with a printing roll 124 having a rubber plate 125 at a certain region of its surface, the alignment liquid applied on the surface of the anylox roll 122 is transcribed to the rubber plate 125. The rubber plate 125 corresponds to a substrate 126 on which the alignment liquid is to be applied and has a mask pattern so that an alignment layer can be selectively printed on the substrate 126. As the substrate 126, loaded on a stage 127, moves in contact with the printing roll 124, the alignment liquid having been transcribed on the rubber plate 125 is re-transcribed on the substrate 126, thereby forming an alignment layer 128. The substrate 126 may be a thin film transistor array substrate or a color filter substrate. In the thin film transistor array substrate, a transparent first substrate is provided; a plurality of gate lines and data lines are horizontally and vertically arranged on the substrate to thereby define pixel regions; a thin film transistor (a driving device) connected to the corresponding gate line and the corresponding data line, is formed at each pixel region; a passivation film is formed on an entire surface of the first substrate including the thin film transistors and pixel regions and transparent pixel electrodes are formed thereon. In addition, in the color filter substrate, a transparent second substrate is provided, a black matrix is formed on the substrate, a color filter is formed at a region corresponding to the pixel region, and a common electrode is formed thereon. The common electrode and the pixel electrode, which are used for generating a lateral electric field, may be formed together at each pixel region of the first substrate.

The alignment liquid 120 used for the present invention is a polyimide series high molecular compound, which contains an MR fluid (Magneto-rheological fluid) having magnetic properties when exposed to a magnetic field. The MR fluid is made of carbonyl of mixture of fine powder and a nonmagnetic liquid such as a mineral. The MR fluid has electric properties called paramagnetism when exposed to a magnetic field. In addition, the MR fluid has a property that its viscosity rapidly increases when a magnetic field is applied thereto. Accordingly, if a magnetic field is not applied thereto, particles loosely spread in the fluid, and, if a magnetic field is applied, the particles become fine magnets and make a long chain in a brief instant. A strong magnetic field makes the MR fluid into a solid.

As shown in FIG. 5, if a magnetic field is applied by a magnetic field generating device 130 to the alignment layer 128 containing the MR fluid having such properties, rubbing in effect (i.e., aligning) is performed on the alignment layer 128 in a direction opposite or at an angle to a moving direction of the substrate 126 by the properties of the MR fluid. That is, the substrate 126 is moved while a position of the magnetic field generating device 130 is fixed. Under these circumstances, if the magnetic field is applied to the alignment layer 128, the MR fluid material in the alignment layer exhibits 128 paramagnetism and moves towards the magnetic field generating device 130 according to its paramagnetism. Because the viscosity of the MR fluid increases when the magnetic field is applied thereto, the MR fluid maintains its shape having formed as the MR fluid material is moved, and forms a valley on the surface of the alignment layer 128 together with other materials (e.g., polyimide) which receive the force of the magnetic field around the MR fluid. A rubbing angle is determined by the moving speed of the substrate 126 and the intensity of the magnetic field. For example, if the moving speed of the substrate 126 becomes low and the intensity of the magnetic field becomes high, a rubbing angle formed on the alignment layer 128 becomes large.

In addition, the rubbing angle is determined by the amount of MR fluid contained in the alignment layer 128. Because the MR fluid reacts to the magnetic field, if the amount of the contained MR fluid become large, the alignment layer 128 more easily reacts to the magnetic field. Accordingly, if time for the MR fluid to be exposed to the magnetic field is the same, a rubbing angle of an alignment layer containing a large amount of the MR fluid is larger than that of an alignment layer containing a small amount of the MR fluid.

The magnetic field generating device 130 is made in such a manner that a coil is wound around a metallic bar. When a current is applied to both ends of the coil, a magnetic field is induced around the coil. Accordingly, the intensity of a magnetic field can be controlled according to the amount of current applied to both ends of the coil.

Figure 6:
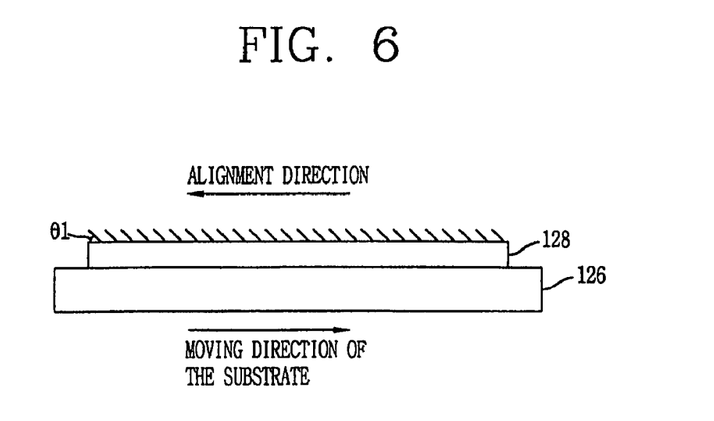
FIG. 6 is a view showing a rubbing direction formed on the alignment layer after the rubbing process and a moving direction of a substrate according to the present invention.

FIG. 6 shows an alignment direction of an alignment layer which has passed through a magnetic field. As shown therein, the alignment direction of the alignment layer 128 is formed in a direction opposite or at an angle to a moving direction of the substrate 126. This is because the alignment layer 128 has a property of moving toward the magnetic field because of the MR fluid component in the alignment layer.

After a rubbing angle (θ1) is formed on the alignment layer 128 by exposing the alignment layer to the magnetic field, the alignment layer is fired upon receiving proper heat so that a shape of the alignment layer is fixed. In such a rubbing method of an LCD device, because pressure is not applied from the outside, uniform rubbing can be performed on the entire substrate without regard to a step formed on the substrate and the size of the substrate.

As described above, in the present invention, the rubbing is performed (i.e., the effect of rubbing is realized) in such a manner that an alignment layer (PI) is mixed with a material containing a magnetic component or an MR fluid viscosity of which increases by a magnetic field and then the mixture is exposed to a magnetic field.

The rubbing may be made by a movement of the substrate or the magnetic field generating device. However, because the rubbing direction of the alignment layer is different according to a driving method of an LCD device, the rubbing direction is preferably determined by the movement of the substrate. Namely, in case of moving the magnetic field generating device, the rubbing direction is determined only by a moving direction of the magnetic field generating device regardless of its rotary angle, However, in case of moving the substrate, because the rubbing direction may be varied according to a rotation direction of the substrate, the rubbing direction can be freely varied in accordance with a driving method of an LCD device.

Figure 7:
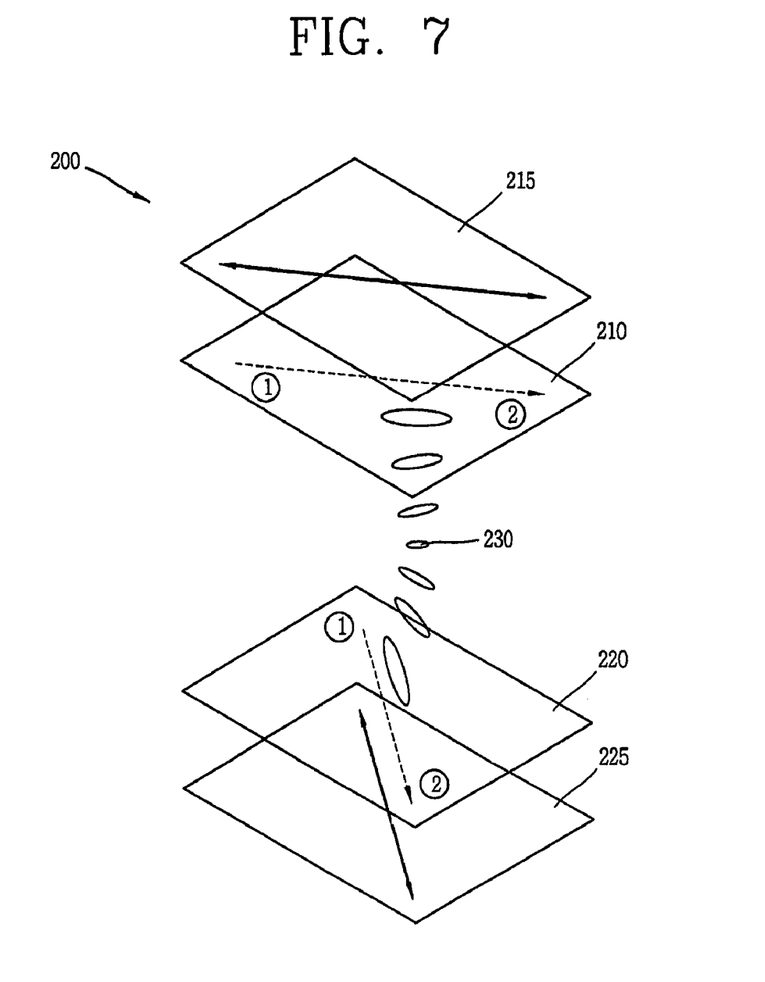
FIG. 7 is a view showing a TN mode LCD device according to the present invention.

FIG. 7 shows a rubbing direction for a TN mode LCD device, wherein a solid line represents an optical axial direction, and a dotted line represents a rubbing direction. Also, ① represents a starting point of rubbing, and ② represents an ending point of the rubbing.

In general, in the TN mode LCD device, a pixel electrode (not shown) is formed on a first substrate 210, and a common electrode (not shown) is formed on a second substrate 220. When an electric field is applied therebetween, liquid crystals 230 formed between the first substrate 210 and the second substrate 220 rotate, thereby transmitting or blocking light. In such a manner, the TN mode LCD device displays a text or an image. Rear surfaces of the first substrate 210 and the second substrate 220 are provided with first and second polarizing plates 215 and 225, respectively. Polarizing directions of the polarizing plates 215 and 225 are the same as rubbing directions. Namely, the polarizing direction of the first polarizing plate 215 is the same as the rubbing direction of the first substrate 210, and the polarizing direction of the second polarizing plate 225 is the same as the rubbing direction of the second substrate 220. The rubbing direction is a diagonal direction of the substrate 210, 220, and the polarizing directions of the first and second polarizing plates 215 and 225 are perpendicular to each other.

In the TN mode LCD device constructed as above, when a voltage is not applied thereto, the liquid crystals 230 are arranged along the rubbing directions of the first and second substrates 210 and 220, and the upper liquid crystals and the lower liquid crystals are arranged in opposite direction to each other, making a twisted form. Accordingly, light incident from a back light is transmitted through the second polarizing plate 225, the liquid crystal layer 230 and the first polarizing plate 215 and displays white on a screen.

In contrast, when a voltage is applied thereto, an electric field is formed between the pixel electrode and the common electrode, and the liquid crystals 230 are driven along the electric field direction. Here, the liquid crystals 230 control the transmittance of light according to the intensity of the voltage, and, when the liquid crystals 230 are arranged in a vertical direction, a black image is displayed.

As described above, in the TN mode LCD device, because the rubbing directions are the same as the diagonal directions of the substrate, the substrate should be rotated at certain angles for achieving the diagonal rubbing directions.

Figure 8A:
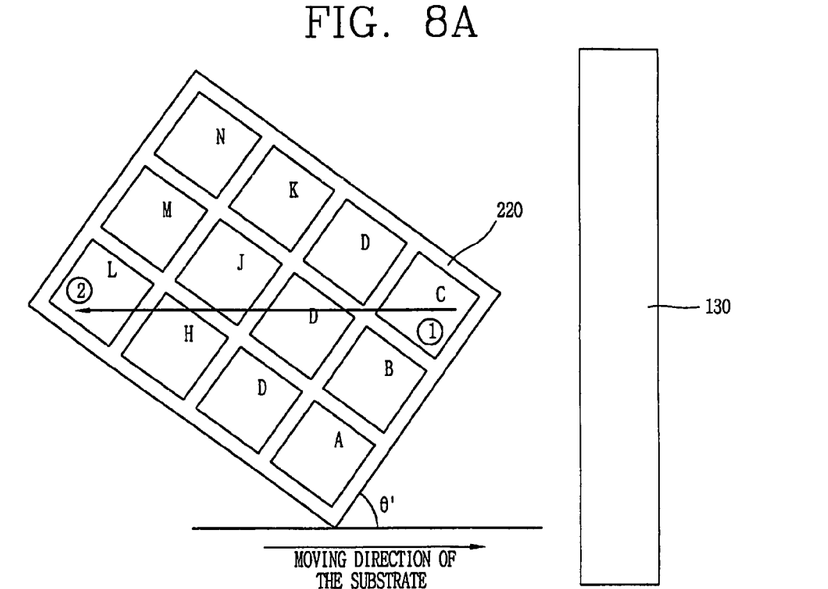
FIGS. 8A and 8B are views showing a rubbing method of a TN mode LCD device according to the present invention.
Figure 8B:
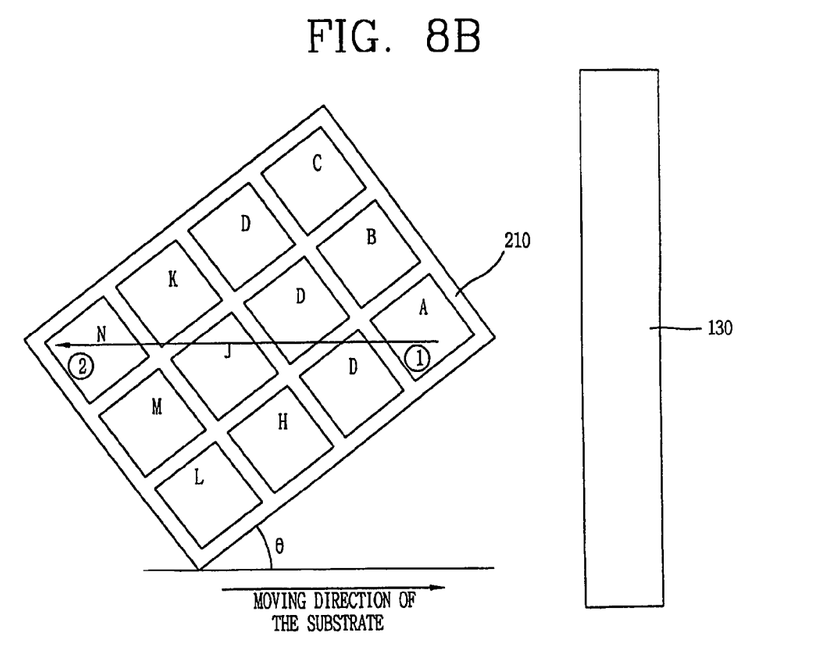

FIGS. 8A and 8B show rubbing directions of the first substrate (upper substrate) and the second substrate (lower substrate) of the TN mode LCD device, respectively. A~N in the drawings respectively depict unit panels of the LCD device by positions for the sake of convenience in description.

As shown in FIGS. 8A and 8B, the first substrate 210 is rotated at a certain angle (θ) in order to determine a rubbing direction as a diagonal direction of the upper substrate 210 and then passes under the magnetic field generating device 130. The rotation angle (θ) determines the rubbing direction of the substrate, and, the rubbing for the first substrate 210 is performed from an A panel as a starting point ① to an N panel as an ending point ② as the first substrate 210 passes under the magnetic field generating device 130.

The rubbing for the second substrate 220 is performed in a direction perpendicular to the rubbing direction of the first substrate 210. To this end, the second substrate 220 is rotated at a certain angle (θ') and passes under the magnetic field generating device 130. Accordingly, the rubbing of the second substrate 220 is performed from a C panel as a starting point ① to an L panel as an ending point ②.

Figure 9:
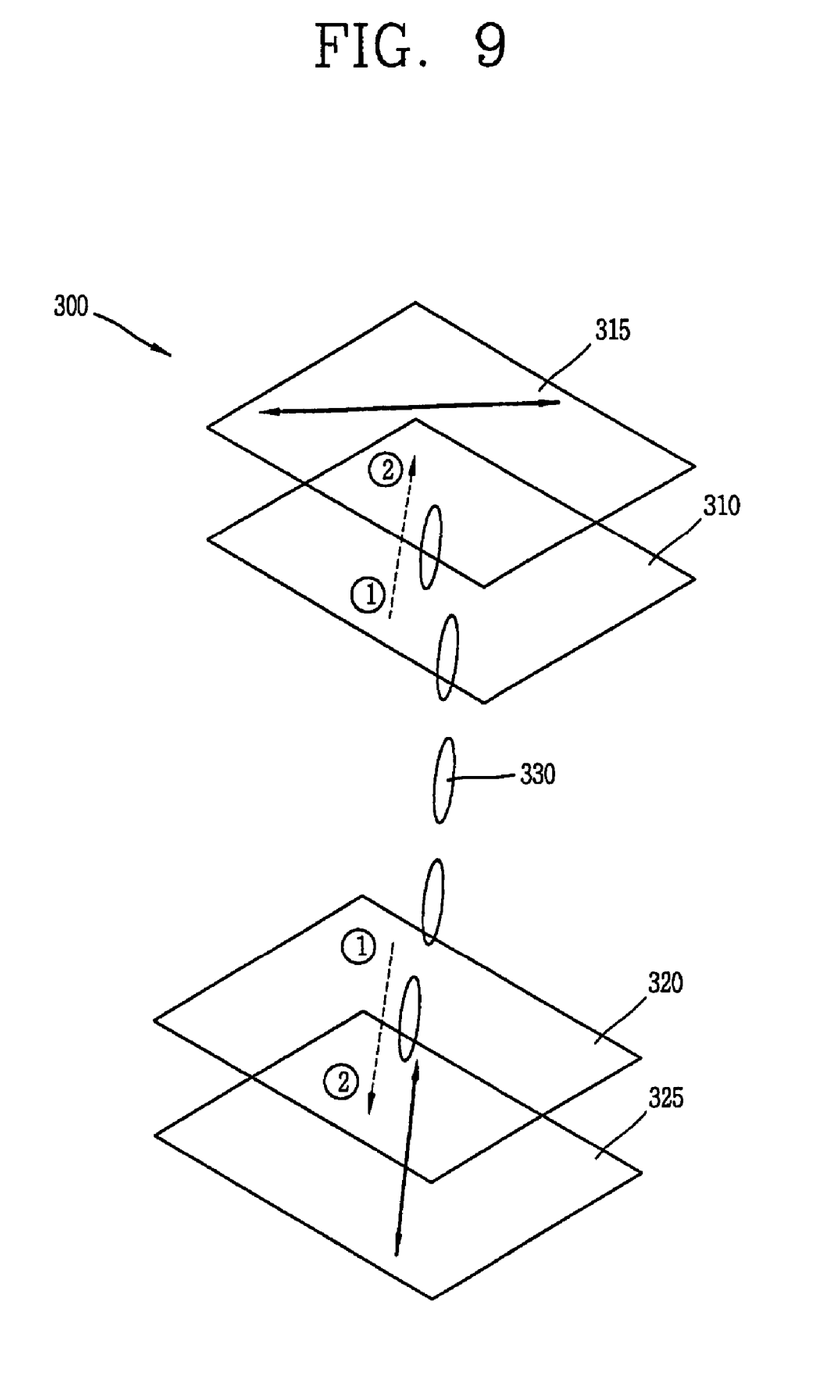
FIG. 9 is a view showing an IPS mode LCD device according to the present invention.

FIG. 9 shows an IPS mode LCD device, where a solid line therein represents an optical axial direction of a polarizing plate, and a dotted line shows a rubbing direction. Also, ① represents a starting point of the rubbing, and ② represents an ending point of the rubbing.

In general, in the IPS mode LCD device 300, a pixel electrode and a common electrode (not shown) are formed together on a second substrate 320 on which a thin film transistor is formed, and rear surfaces of the first substrate 310 and the second substrate 320 are provided with first and second polarizing plates 315 and 325, respectively. And rubbing directions of the first and second substrates 310 and 320 are the same, and a polarizing direction of the second polarizing plate 325 is the same as the rubbing direction. Also, a polarizing direction of the first polarizing plate 315 is perpendicular to that of the second polarizing plate 325.

In the IPS mode LCD device constructed as above, when an electric field is not applied thereto, liquid crystals are arranged along the rubbing directions, and light incident from a back light transmits through the second polarizing plate 325 and a liquid crystal layer 330 but is blocked by the first polarizing plate 315, thereby displaying a black image.

In contrast, when a voltage is applied thereto, a lateral electric field is formed between the pixel electrode and the common electrode, and the liquid crystals 330 are driven along the electric field direction. When a driving direction of the liquid crystals is at an angle of 45° to the rubbing direction, the transmittance becomes maximum. Here, the rubbing direction is formed to be inclined at a certain angle to an electrode direction.

Figure 10A:
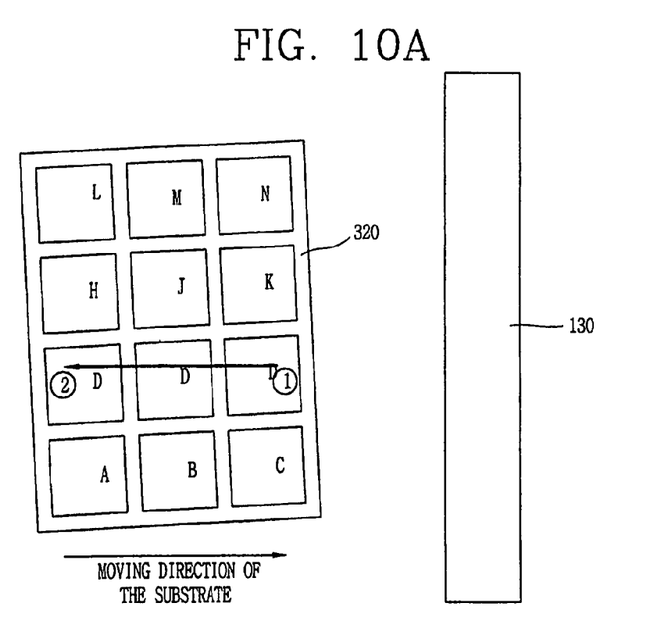
FIGS. 10A and 10B are views showing a rubbing method of an IPS mode LCD device according to the present invention.
Figure 10B:
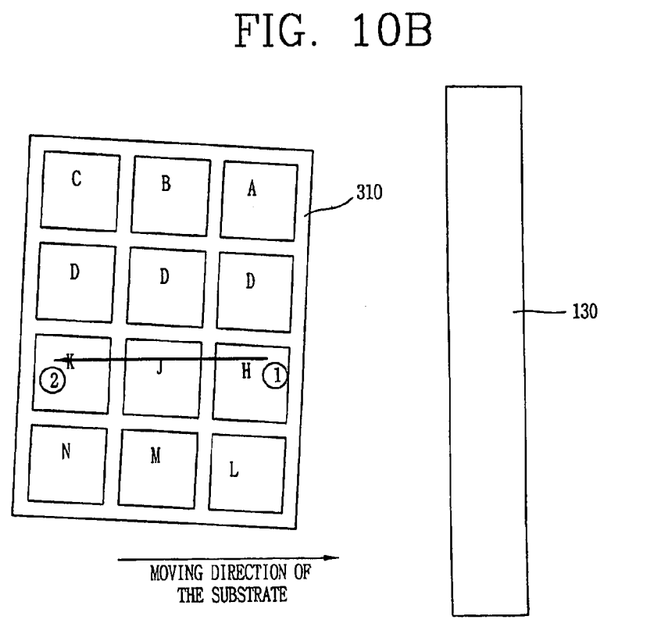

FIGS. 10A and 10B show rubbing directions of the first substrate (upper substrate) and the second substrate (lower substrate) of the IPS mode LCD device, respectively. As shown therein, the substrates 310 and 320 are rotated to correspond to the rubbing directions and pass under the magnetic field generating device 130, so that the rubbing is performed thereon. At this time, as for the first and second substrates 310 and 320, their starting points ① and ending points ② are different, but their rubbing directions are the same.

As described above, the reason why only the substrates (TFT substrates or color filter substrates) are moved and the magnetic field generating device is stationary is that moving the substrates can freely control rubbing directions. For example, even if the magnetic generating device is rotated in any direction and then moved in a state a substrate is fixed in order to perform the rubbing twisted at a certain angle on the substrate, the rubbing is always made in the same direction. On the other hand, when the magnetic field generating device is fixed and the substrate is rotated, the rubbing direction can be changed freely.

The magnetic field generating device may be moved along a rubbing direction. However, this method is disadvantageous in that a moving direction of the magnetic field generating device has so ce has to be changed according to a driving mode of an LCD device.

As so far described, the present invention provides a rubbing method of an LCD device, and particularly, a rubbing method of an LCD device, using a magnetic field. An MR fluid that reacts to a magnetic field or other magnetic material is mixed with an alignment liquid, and then the mixture is exposed to the magnetic field, thereby decreasing defective rubbing and improving image quality as compared to the related art. That is, the related art has problems such that, because the rubbing is made using a rubbing cotton, the rubbing roll may be damaged by a step formed on the substrate, then, the damaged rubbing roll may scratch an alignment layer, image deterioration may occur by alignment layer remnants generated after rubbing, and such problems are not good for large size substrates. In contrast, in the present invention, because the rubbing is made through a magnetic field, results of the defective rubbing, such as scratches or alignment remnants may be reduced or eliminated, and the rubbing can be performed uniformly even on large size substrates.

As described above, the present invention is useful for large size substrates and removes defective rubbing causes to thereby improve image quality by rubbing an alignment layer using a magnetic field.

As the present invention may be embodied in several forms without departing from the spirit or essential characteristics thereof, it should also be understood that the above-described exemplary embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A system for forming an alignment layer of a liquid crystal display device, the system comprising:
   means for applying an alignment layer material having a magneto-rheological fluid onto a substrate to form an alignment layer, the alignment layer being contacted with a liquid crystal layer of the liquid crystal display device;
   a magnetic field generator for applying a magnetic field to directionally align the alignment layer material; and
   means for firing the directionally aligned alignment layer material,
   wherein the alignment layer material includes a magnetic field component, the alignment layer is rubbed by the magnetic field and liquid crystal molecules of the liquid crystal layer are aligned along a rubbing direction,
   wherein the rubbing direction of the alignment layer is an opposite direction from a moving direction of the substrate,
   wherein a rubbing angle of the alignment layer is increased by decreasing a moving speed of the substrate and increasing an intensity of the magnetic field from the magnetic field generator, and
   wherein the rubbing angle of the alignment layer is increased by increasing the amount of the a magneto-rheological fluid within the alignment layer.

2. The system of claim 1, further including means for applying the magnetic field to the alignment layer by passing the substrate under the magnetic field generator that has a fixed position.

3. The system of claim 2, further comprising means for rotating the substrate at a certain angle.

4. The system of claim 3, wherein the rotation angle of the substrate determines the alignment direction of the alignment layer material.

5. A system for forming an alignment layer for a liquid crystal display device, comprising:
- means for supporting a substrate;
- means for applying an alignment liquid containing a magneto-rheological fluid and a magnetic field component onto the substrate to form an alignment layer, the alignment layer being contacted with a liquid crystal layer of the liquid crystal display device;
- means for rotating the substrate on which the alignment layer has been applied at a certain angle;
- means for passing the substrate under a magnetic field generating device by moving the substrate and forming a valley having a rubbing angle $\theta 1$ to determine a pre-tilt angle of liquid crystal molecules by exposing the alignment layer to a magnetic field,
- means for firing the alignment layer exposed to the magnetic field,
- wherein the alignment layer is rubbed by the magnetic field and liquid crystal molecules of the liquid crystal layer are aligned along a rubbing direction,
- wherein the rubbing direction of the alignment layer is an opposite direction from a moving direction of the substrate,
- wherein the rubbing angle $\theta 1$ of the alignment layer is increased by decreasing a moving speed of the substrate and increasing an intensity of the magnetic field from the magnetic field generator, and
- wherein the rubbing angle $\theta 1$ of the alignment layer $\theta 1$ is increased by increasing the amount of the magneto-rheological fluid within the alignment layer.

* * * * *